Patented June 12, 1928.

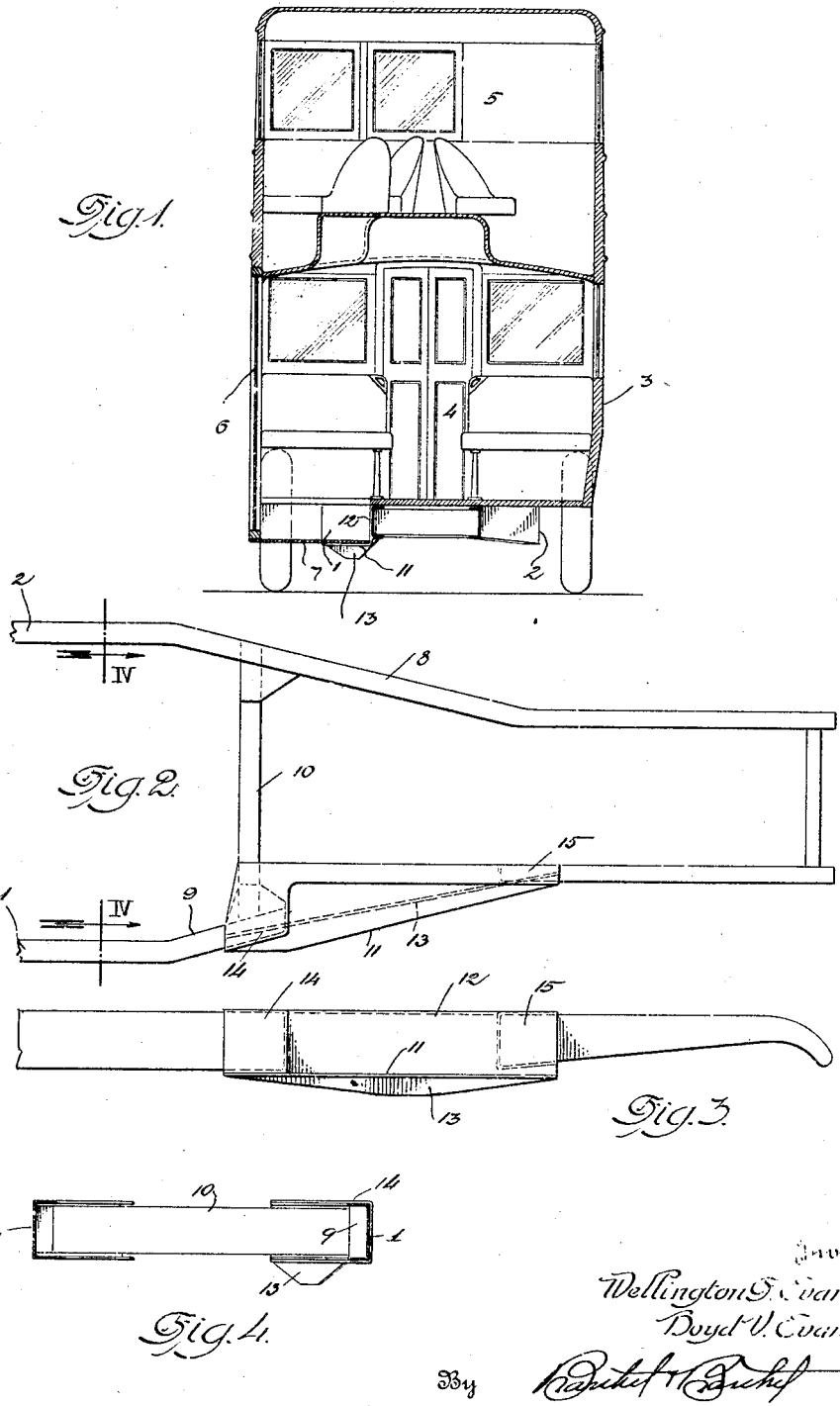

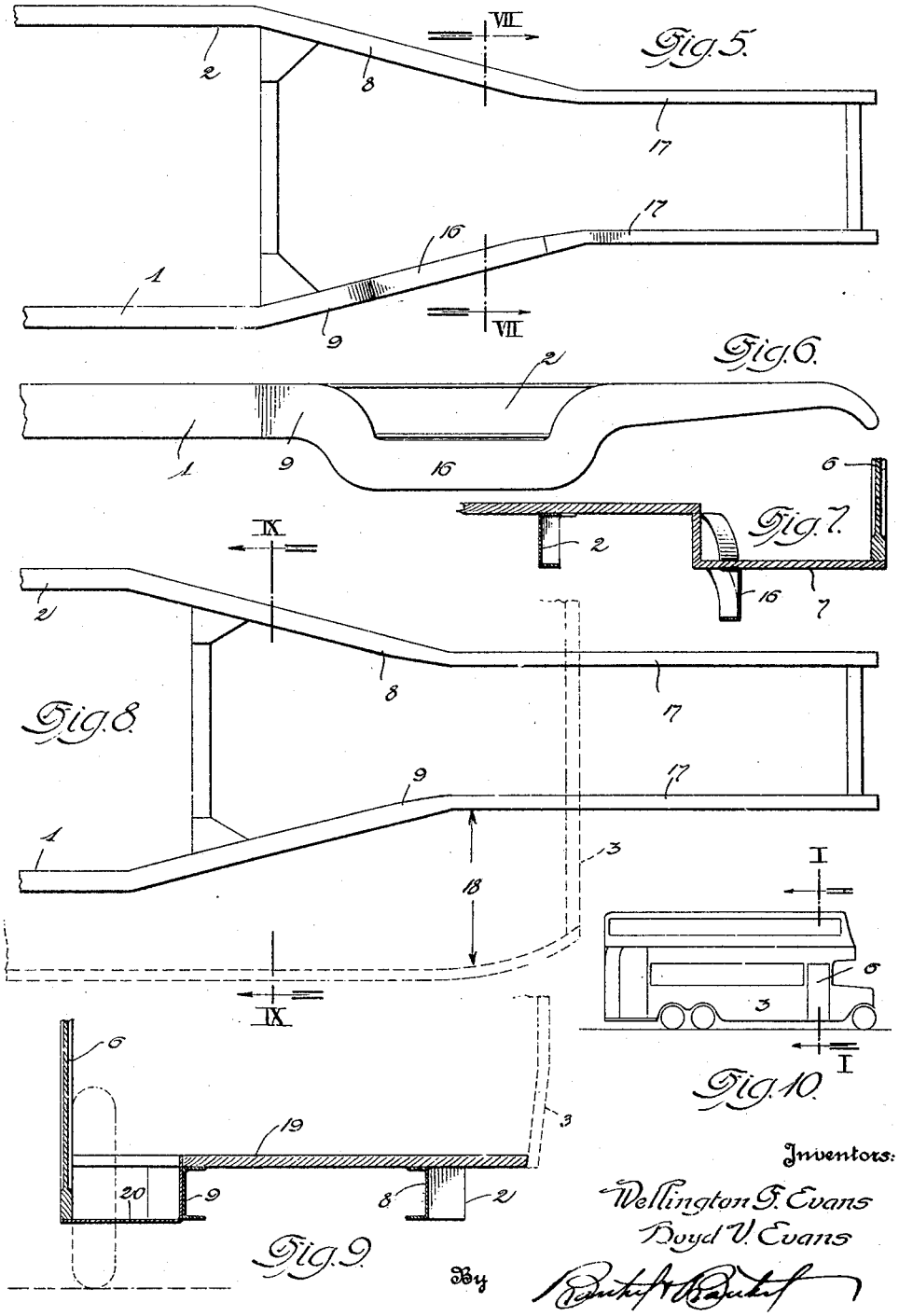

1,673,351

UNITED STATES PATENT OFFICE.

WELLINGTON F. EVANS AND BOYD V. EVANS, OF DETROIT, MICHIGAN.

MOTOR-BUS CHASSIS AND STEP CONSTRUCTION.

Application filed July 24, 1925, Serial No. 45,757. Renewed November 16, 1927.

This invention relates to motor buses and has special reference to a chassis or underframe construction for a double deck, fully inclosed motor bus body provided with a front side exit for the passengers of the lower deck of the motor bus. This type of motor bus is disclosed in my companion application, filed under even date.

The object of this invention is to provide a chassis or underframing for a motor bus which will afford support for an exit platform or step, besides cooperating with the bus body in providing clearance for a side doorway.

The above object may be attained in two ways. First, the chassis may have one of its side frames formed in two parts and a step or platform part interposed and connected to the separated frame parts, so that there is practically a continuous frame possessing the usual strength and rigidity. Second, the chassis may be elongated or proportioned relative to the position of the bus body thereon so that converging portions of the chassis will afford ample room for an exit platform or step when one of the frames of the chassis is formed with a countersunk or depressed portion.

The constructions by which we attain these results will be hereinafter specifically described and then claimed, and reference will now be had to the drawings, wherein Figure 1 is a vertical cross sectional view of our motor bus looking towards the rear end thereof and showing the side exit door and platform;

Fig. 2 is a plan of the forward end of the chassis which contributes to the construction shown in Fig. 1;

Fig. 3 is a side elevation of the chassis shown in Fig. 2;

Fig. 4 is a cross sectional view taken on the line IV—IV of Fig. 2;

Fig. 5 is a plan of a portion of a chassis having a countersunk side frame;

Fig. 6 is a side elevation of the same;

Fig. 7 is a cross sectional view taken on the line VII—VII of Fig. 5 with the exit platform in position;

Fig. 8 is a plan of a portion of an elongated chassis;

Fig. 9 is a cross sectional view taken on line IX—IX of Fig. 8 showing an exit platform in connection with the chassis, and Fig. 10 is a diagrammatic elevation of a motor bus in accordance with our invention showing a line I—I on which Fig. 1 is taken.

The motor bus chassis comprises side frames 1 and 2 adapted to support a bus body 3 including a lower passenger compartment 4 and an upper deck passenger compartment 5. To facilitate unloading the lower passenger compartment 4 the bus body is provided with a front side door 6 and in order that passengers may conveniently leave by the front exit a platform or step 7 is set in the body and in proximity to the ground, so that there may be a low step from the body to the ground. In order that the exit platform or step 7 may be supported relative to the chassis frames 1 and 2, said frames are provided with converging portions 8 and 9 connected by a transverse member 10. The converging portion 9 of the side frame 1 has a part thereof removed so that the side frame 1 is practically in two parts. These separated parts are adapted to be connected by an inserted platform supporting member 11 formed with a vertical channel portion 12 and a bottom longitudinal reinforcing rib 13. The ends of the member 11 are formed with socket portions 14 and 15 to receive the end portions of the side frame 1, and with the member 11 substantially triangular in plan the socket portion 14 is larger than the socket portion 15 so that the socket portion 14 may extend over and under the end of the transverse member 11. These socket portions are adapted to be riveted or otherwise rigidly fixed to the side frame 1 to maintain the rigidity just as though it were a solid member like the side frame 2. The step supporting member 11 permits of the platform 7 being suitably fastened thereto and the door 6 may be readily shifted relative to the outer edge of said platform.

In Figs. 5, 6 and 7 we show how this same result may be obtained in another manner and in this instance the side frame 1 of the chassis may have its converging portion 9 provided with a countersunk or depressed portion 16 on which may be mounted the platform or step 7. In both of these instances the forward end of the bus body terminates at the front ends of the converging portions 8 and 9 and at the beginning of the motor supporting portions 17 of the chassis. If these motor supporting portions 17 are lengthened, as shown in Fig. 8, the bus body 3 may have its front end beyond or forward of the converging portions 8 and 9, in which instance there will be a space, designated 18, of sufficient width between the side frame 1 and the side wall of the bus body 3 to provide clearance for an exit platform or step in a plane below the floor of the bus body. Such is clearly brought out in Fig. 9 where the floor is designated 19 and the step 20. The platform or step 20 may be suitably supported relative to the chassis frame and said chassis frame may be designed for four or six wheels with a suitable power plant for driving the wheels.

We do not care to confine our invention to any details of construction, other than defined in the appended claims.

What we claim is:—

1. In a motor bus, a chassis adapted for supporting a bus body having a front side door exit, said chassis being composed of parallel frames having converging portions terminating in parallel end portions, one of said converging frame portions being cut away, and a platform supporting member in said cut away frame portion, said member including a vertical channel portion alining with one of the parallel end portions and having a socket portion to receive one of the converging portions.

2. A motor bus chassis as called for in claim 1, and a transverse member connecting the converging portions, with the socket member of said platform supporting member extending on to said transverse member.

3. A motor bus chassis as called for in claim 1, and a reinforcing rib on said platform supporting member and extending in the general direction of the cut away converging frame portion.

In testimony whereof we affix our signatures.

WELLINGTON F. EVANS.
BOYD V. EVANS.